United States Patent [19]

Brook

[11] Patent Number: 5,065,543
[45] Date of Patent: Nov. 19, 1991

[54] TREE GUARD MAT

[76] Inventor: Alan R. Brook, 7206 Hidden Hills North, San Antonio (Bexar County), Tex. 78244

[21] Appl. No.: 532,554

[22] Filed: Jun. 4, 1990

Related U.S. Application Data

[63] Continuation-in-part of Ser. No. 320,981, Nov. 17, 1990, abandoned.

[51] Int. Cl.⁵ .............................................. A01G 17/00
[52] U.S. Cl. ............................................. 47/25; 47/32; 428/37
[58] Field of Search ................ 47/25, 32, 33; 428/37

[56] References Cited

U.S. PATENT DOCUMENTS

| | | | |
|---|---|---|---|
| 1,372,996 | 3/1921 | Eckart | 47/9 |
| 1,704,801 | 3/1929 | Miller | 47/30 |
| 1,870,275 | 8/1932 | Adams | 428/37 |
| 2,759,865 | 8/1956 | Klob | 428/37 |
| 2,978,837 | 4/1961 | Daniels | 47/25 |
| 3,481,245 | 12/1969 | Kamitani | 428/37 |
| 3,940,884 | 3/1976 | Mason | 47/32 |
| 4,395,845 | 8/1983 | Markowitz | 47/32 |
| 4,648,203 | 3/1987 | Worzek | 47/32 |
| 4,858,378 | 8/1989 | Helmy | 47/25 |

FOREIGN PATENT DOCUMENTS

| | | | |
|---|---|---|---|
| 859392 | 12/1970 | Canada | 47/32 |
| 3121590 | 12/1982 | Fed. Rep. of Germany | 47/32 |
| 45874 | 2/1909 | Switzerland | 47/25 |
| 1378663 | 12/1974 | United Kingdom | 47/32 |

*Primary Examiner*—Henry E. Raduazo
*Attorney, Agent, or Firm*—Baker & Botts

[57] ABSTRACT

A tree guard mat is made from flexible fiber ropes or fibrous strips arranged in concentric rings to form a mat. For installation around a tree, a selected number of inner rings may be removed until a central hole is equal in diameter to the diameter of the tree. In one embodiment, the ends of the concentric rings are joined along a separation radius so that a gap may be created through which the mat can be installed around a tree trunk. The mat is water and gas permeable, and will suppress plant growth around the base of the tree so that trimming is unnecessary.

5 Claims, 2 Drawing Sheets

TREE GUARD MAT

CROSS-REFERENCE TO RELATED APPLICATIONS

This is a continuation-in-part of U.S. patent application Ser. No. 07/320,981 filed Mar. 9, 1989, and now abandoned.

TECHNICAL FIELD OF THE INVENTION

This invention relates to mats or similar articles that suppress plant growth around the base of trees (such as for preventing damage to tree trunks by making line trimming unnecessary), and more particularly to an improved mat that is easily adjusted for installation around tree trunks of varying sizes, and is permeable to gases and water for healthy root development.

BACKGROUND OF THE INVENTION

Mats or pads adapted to surround a tree trunk at its base have been used for various reasons, such as to reduce moisture loss or to protect tree roots from insects or extremes of heat or cold. Such articles also suppress grass around the base of the tree.

The use of line trimmers to trim grass around trees inevitably results in the line striking the tree trunk, and lacerating the tree bark. In addition to aesthetic damage, these lacerations break the tree's natural bark barrier to insects and disease, and can cause vascular damage and increased susceptibility to rotting and decay.

Using a tree mat to suppress grass around the base of a tree trunk would obviate line trimming at the base of the tree, thereby preventing damage to the tree trunk caused by line trimming. However, existing tree mats are all disadvantageous in certain aspects.

The principal disadvantage with existing tree mats is that installation is difficult because they are not readily adjustable to tree trunks of varying sizes (either initially or as the tree grows). For example, existing mats typically must be cut or carved to provide a central hole sized to accommodate the tree trunk. Also, some of these tree mats are made from materials that are substantially impermeable to water and oxygen and carbon dioxide, which is particularly detrimental to young trees for which water and gas exchange for the entire root structure is important.

Accordingly, a need exists for an improved tree guard mat that can be easily installed to protect trees from damage caused by line trimmers.

SHORT STATEMENT OF THE INVENTION

An object of the invention is to prevent tree trunks from being damaged by line trimmers using a tree guard mat that is readily adjustable for installation around tree trunks of varying sizes.

The invention is a tree guard mat that is formed by concentric, flexible fibrous rings removably attached. The rings are cut along a separation line extending from a central point to the outermost ring. Alternatively, the tree guard mat can be formed from flexible or rigid fibrous material in which is defined concentric removable rings, with the mat being cut into two sections along a diametrical separation line and removably fastened together.

To install the tree guard mat around a tree, interior rings are removed until a central hole in the mat corresponds in diameter to the diameter of the tree at ground level. The mat is then inserted around the tree trunk, either by separating the rings along the separation line to form a gap through which the mat is passed over the tree trunk, or by unfastening the two sections and positioning them around the tree trunk. Once positioned around the tree trunk, the rings are rejoined to form a substantially continuous mat with the tree trunk extending through the central hole.

In a preferred embodiment, the tree guard mat is formed from a semi-rigid sheet of fibrous material (such as a pressed paper) that is substantially permeable to water and gas. Concentric rings or strips are defined in the mat (such as by indentations or perforations). The mat is cut into two sections substantially along a diametrical separation line, and removably fastened together at that separation line, such as by a lug fastening arrangement.

Among the features and advantages of this invention are the following. The tree guard mat is formed of concentric rings, allowing easy adjustment to any size tree trunk merely by removing a selected number of rings upon initial installation andor as the tree grows. In one embodiment, the mat is rigid or semi-rigid, and configured in separable sections to permit installation. In another embodiment, the rings can be made flexible, so that the mat is flexible, allowing easy insertion around the tree trunk. The tree guard mat is permeable, allowing water and gas to reach the roots beneath the mat. The tree guard mat is made of fibrous material, yielding a strong but permeable mat, readily adjustable and easily installable tree guard that is also aesthetically pleasing.

For a more complete understanding of the invention, and for further features and advantages, reference is now made to the following Detailed Description of exemplary embodiments of the invention, taken in conjunction with the accompanying Drawings. Although the Detailed Description, and the Drawings, are with respect to specific, exemplary embodiments of the invention, various changes and modifications may be suggested to one skilled in the art, and it is intended that the invention encompass such changes and modifications as fall within the scope of the appended claims.

DESCRIPTION OF THE PREFERRED EMBODIMENT

A description of the exemplary embodiments of the tree guard mat of this invention, which protects trees from damage due to line trimmers, includes a detailed description of the mat and its installation.

Figure 1:
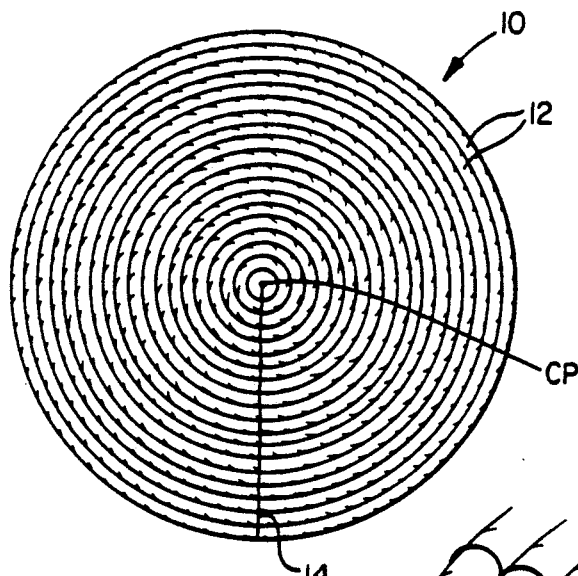
FIG. 1 shows a tree guard mat prior to installation, including the concentric rings that form the mat.
Figure 2A:
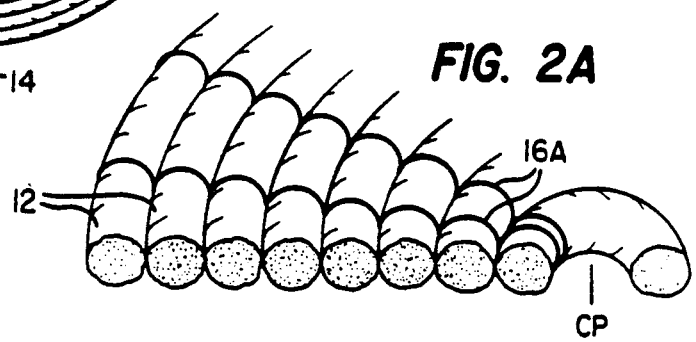
FIGS. 2A and 2B are cross-sectional views showing the cross-sections of the individual rings bound together by alternative weaving techniques.
Figure 2B:
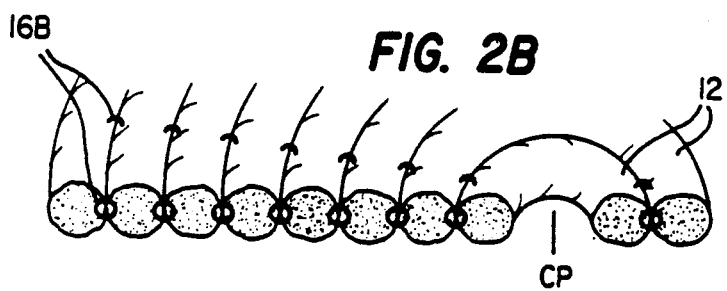

4.1 Tree Guard Mat—Rope Embodiment. As shown in FIGS. 1 and 2A/2B, a tree guard mat 10 is formed from a plurality of concentric rings 12 disposed around a central point CP to provide a substantially flat, circular mat. Rings 12 are made of a flexible material. Each ring is cut along a radial separation line 14 extending from the central point CP through the innermost to the outermost rings. This separation line permits the rings 12 to be separated to form a passage for inserting mat 10 around a tree trunk.

As illustrated in FIGS. 2A/2B, rings 12 are bound together, by weaving string or wire around the rings along a number of radial lines (16A), or alternatively through the edges of adjacent rings (16B), to form a tightly bound, substantially flat mat.

For this embodiment, rings 12 comprise flexible ropes made of a natural or synthetic fiber material, permeable to both water and gas. To form the tree guard mat, successively larger lengths of rope are formed into concentric rings around the central point CP, with the ends of the ropes being joined along a single radius to form the separation line 14. The concentric rings are then bound together by weaving to form a strong but flexible, readily adjustable tree guard mat.

Figure 4A:
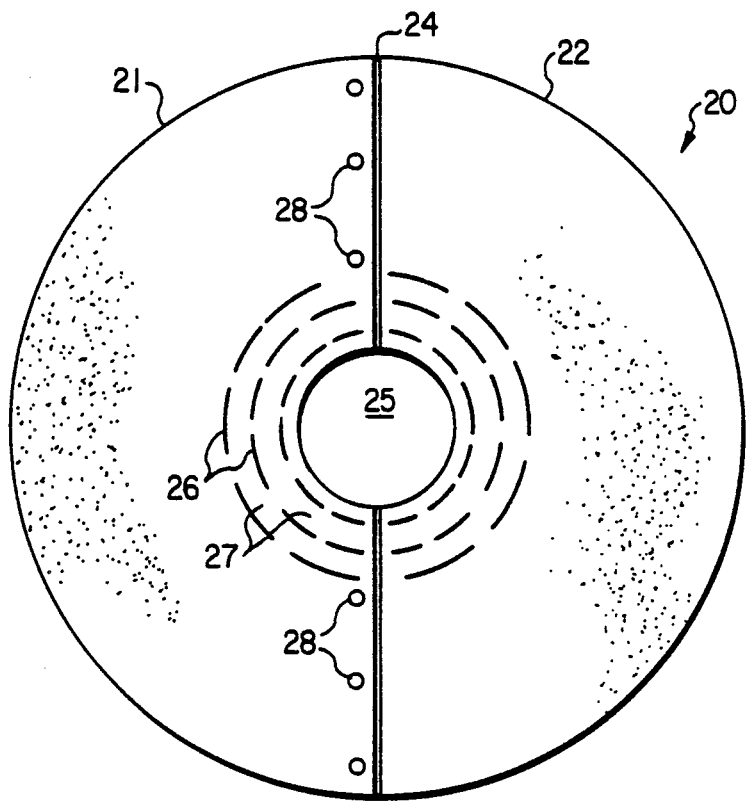

4.2. Tree Guard Mat—Rigid Sheet Embodiment. An alternative embodiment of the tree guard mat is shown in FIGS. 4A/4B. For this embodiment, a mat 20 is fabricated from rigid or semi-rigid fibrous material (natural or synthetic). Preferably, tree guard mat 20 is fabricated from a pressed paper material, which yields a semi-rigid sheet that is permeable to both air and water. The mat sheet can be formed with holes or perforations 20a distributed over a portion or all of the sheet to increase permeability.

Mat 20 includes two sections 21 and 22 separated at a separation line 24. A central hole 25 defines an initial opening for a tree trunk.

Mat 20 includes concentric indentations or perforations 26 that define concentric rings or strips 27. Other means of pre-defining strips 27 may be used. Opening 25 can be made larger by cutting or tearing away strips at the indentations/perforations 26.

Figure 4B:
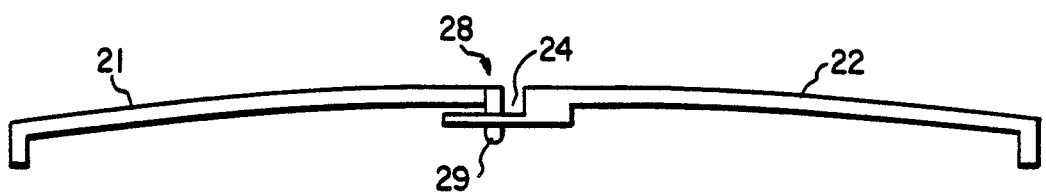

Preferably, mat sections 21 and 22 can be fastened (and unfastened), such as by using a lug arrangement 28, which is shown in detail in FIG. 4B. That is, mat section 21 is fabricated with lugs 29 along separation line 24, while mat section 22 is fabricated with corresponding lug holes.

Figure 3:
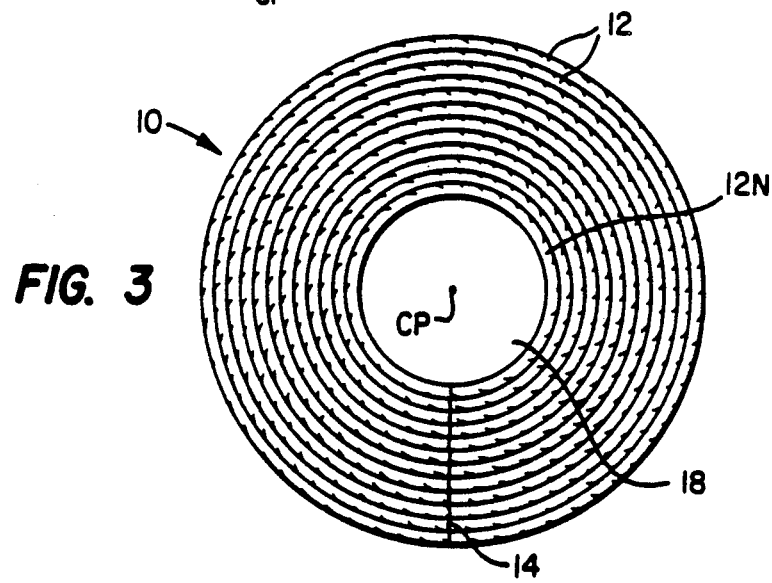
FIG. 3 shows the tree guard mat with a number of interior rings removed to provide a central hole FIGS. 4A and 4B respectively show the tree guard mat configured in two sections, and a lug fastening arrangement.

4.3. Installation. As shown in FIG. 3, installation of the embodiment of the tree guard mat 10 shown in FIGS. 1 and 2A/2B around a tree trunk involves removing a sufficient number of interior rings 12 such that a hole 18 is left in the center of the mat, with the hole 18 corresponding in diameter to the diameter of the tree trunk at ground level. That is, the circumference of the innermost remaining ring 12N corresponds substantially to the circumference of the tree trunk. The interior rings 12 are removed by cutting the string or wire binding those rings.

Tree guard mat 10 is then inserted around the tree trunk by separating rings 12 along separation line 14, and passing the mat through the resulting passage over the tree trunk until the trunk is within the area formed by hole 18, with innermost ring 12N being positioned around and adjacent to the tree trunk. The rings 12 are rejoined at separation line 14 to provide a substantially continuous mat extending around the tree trunk.

After initial installation, additional rings may be removed if and as the tree grows.

Once installed, the tree guard mat will suppress the growth of grass, weeds and other plants from the area around the tree trunk, thereby obviating trimming such growth and preventing the damage that inevitably results from trimming.

Installation of the embodiment of the tree guard mat 20 shown in FIGS. 4A and 4B involves unfastening the mat sections 21 and 22 and removing a sufficient number of rings for the tree diameter. The sections are then placed around the tree, and joined at the separation line 24 and fastened using the lug arrangement 28 (or some other fastening means).

4.4. Additional Embodiments. Modifications to the above embodiments include the following. While rings 12 are preferably formed from fiber rope, other flexible materials may be used. Also, the mat may be formed from a single sheet of material, with the concentric rings being defined by concentric perforation lines, such as in a stamping operation. Also, only the interior rings likely to be removed need be removably bound. Also, the tree guard mat can serve functions other than suppressing growth around trees (such as by impregnating it with slow-release fertilizer or insecticide.

What is claimed is:

1. A tree guard mat for suppressing plant growth around the base of a tree and thereby protecting the tree from damage caused by line trimmers, comprising:
    (a) a plurality of flexible ropes of successively longer lengths arranged concentrically into a mat;
    (b) each rope being removably bound into the mat; and
    (c) each rope being joined at a separation line extending from the innermost to the outermost rope;
    (d) such that the mat may be adjusted for installation by removing a selected number of inner rings to form a central hole corresponding in diameter to the diameter of the tree trunk at ground level;
    (e) whereby the tree guard mat may be installed by separating the remaining ropes along the separation line, inserting the mat around the tree trunk through a gap formed by that separation, and then rejoining the rings to form a substantially continuous mat around the tree.

2. The tree guard mat defined in claim 1 wherein: the rope is a fiber (natural or synthetic) that is permeable to water and gas.

3. The tree guard mat defined in claim 2 wherein: the ropes are woven together using string or wire, such that an inner rope may be removed by cutting the string or wire binding that ring into the mat.

4. The tree guard mat defined in claim 3 wherein: the mat is formed from substantially circular ropes.

5. The tree guard mat defined in claim 1, wherein the ropes are defined by perforating a sheet of fibrous material.

* * * * *